US008322326B2

(12) United States Patent
Gegg et al.

(10) Patent No.: US 8,322,326 B2
(45) Date of Patent: Dec. 4, 2012

(54) METHOD FOR OPERATING AN INTERNAL COMBUSTION ENGINE

(75) Inventors: Tim Gegg, Remseck (DE); Manuel Dangelmaier, Plochingen (DE); Andreas Neubauer, Ludwigsburg (DE); Wolfgang Layher, Besigheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 988 days.

(21) Appl. No.: 12/318,640

(22) Filed: Jan. 5, 2009

(65) Prior Publication Data

US 2009/0178648 A1 Jul. 16, 2009

(30) Foreign Application Priority Data

Jan. 11, 2008 (DE) ......................... 10 2008 004 040

(51) Int. Cl.
*F02P 9/00* (2006.01)
*F02P 5/15* (2006.01)
*G06F 19/00* (2011.01)

(52) U.S. Cl. .................... 123/335; 123/406.45; 701/110

(58) Field of Classification Search .................. 123/334, 123/335, 406.23, 406.24, 406.45, 406.47, 123/198 DC; 701/103, 104, 110
See application file for complete search history.

(56) References Cited

U.S. PATENT DOCUMENTS

| | | | | |
|---|---|---|---|---|
| 5,133,318 | A * | 7/1992 | Yokotani et al. | 123/335 |
| 6,868,829 | B1 * | 3/2005 | Geyer et al. | 123/406.11 |
| 6,871,132 | B2 * | 3/2005 | Olsen et al. | 701/93 |
| 6,976,472 | B2 * | 12/2005 | Nickel | 123/406.25 |
| 7,493,889 | B2 * | 2/2009 | Nickel et al. | 123/344 |
| 7,735,465 | B2 * | 6/2010 | Kunert et al. | 123/257 |
| 2006/0065236 | A1 * | 3/2006 | Andersson et al. | 123/335 |
| 2006/0086337 | A1 * | 4/2006 | Nickel | 123/335 |

FOREIGN PATENT DOCUMENTS

DE 196 14 464 10/1997

* cited by examiner

*Primary Examiner* — Willis R Wolfe, Jr.
*Assistant Examiner* — Anthony L Bacon
(74) *Attorney, Agent, or Firm* — Walter Ottesen

(57) ABSTRACT

An internal combustion engine (8) has an ignition device, a device for supplying fuel and a device for detecting the rpm of the engine (8). The engine (8) includes a permissible limit rpm ($n_g$) and a control range (A) of the rpm (n) above the limit rpm ($n_g$). A method for operating the engine (8) provides that the rpm of the engine (8) is limited in the control range (A) because of suppression of the ignition in individual engine cycles wherein the rpm (n) lies above a control rpm ($n_a$) lying in the control range (A). In the control range, and to improve the exhaust-gas values, the noncombustion engine cycle ratio (NECR) is adjusted. The NECR indicates the ratio of the number of engine cycles wherein the ignition is suppressed to the total number of ignitions.

14 Claims, 3 Drawing Sheets

METHOD FOR OPERATING AN INTERNAL COMBUSTION ENGINE

CROSS REFERENCE TO RELATED APPLICATION

This application claims priority of German patent application no. 10 2008 004 040.1, filed Jan. 11, 2008, the entire content of which is incorporated herein by reference.

BACKGROUND OF THE INVENTION

German patent publication 196 14 464 A1 discloses that, especially for a handheld portable work apparatus, the ignition is switched off in a targeted manner to control engine speed (rpm). However, uncombusted fuel can escape into the ambient when the ignition is switched off.

SUMMARY OF THE INVENTION

It is an object of the invention to provide a method for operating an internal combustion engine wherein good exhaust-gas values can be obtained.

The method of the invention is for operating an internal combustion engine assembly including an internal combustion engine, an ignition system for controlling the ignition in the engine, a device for supplying fuel and a detecting unit for detecting the engine rpm (n) of the internal combustion engine; the engine defining a permissible limit engine rpm ($n_g$) and a control range (A) of the engine rpm (n) above the limit engine rpm ($n_g$). The method includes the steps of: limiting the engine rpm (n) in the control range (A) by suppressing the ignition; limiting the ignition in the control range (A) by suppressing the ignition in individual engine cycles wherein the engine rpm (n) lies above a control engine rpm ($n_a$); forming a noncombustion engine cycle ratio (NECR) as the ratio of a number of engine cycles wherein the ignition is suppressed to the total number of the ignitions; and, shifting the noncombustion engine cycle ratio (NECR) in the control range (A).

The adjustment of the noncombustion engine cycle ratio (NECR) in the speed control range permits a control of the internal combustion engine in such a manner that good exhaust-gas values can be achieved. A reliable limiting of rpm, as is required for portable handheld work apparatus, is given in that the rpm is limited by suppressing the ignition. The NECR is advantageously increased. It can, however, also be provided that the noncombustion engine cycle ratio (NECR) is reduced, especially, by changing the supplied fuel quantity.

The noncombustion engine cycle ratio (NECR) can be adjusted in a simple manner by changing the supplied fuel quantity. The supplied fuel quantity is especially continuously changed. The supplied fuel quantity is suitably reduced for adjusting the NECR.

By changing the supplied fuel quantity, the supplied fuel quantity can be reduced so that the fuel component escaping uncombusted in cycles without combustion is reduced. At the same time, the number of cycles, for which no combustion takes place, can be increased so that a large portion of the supplied fuel is combusted in the internal combustion engine. In this way, the exhaust-gas values can be improved and the overall fuel consumption can be reduced. At the same time, a reliable rpm limiting in the speed control range results.

Advantageously, the noncombustion engine cycle ratio (NECR) is adjusted until it has dropped to below 20% (advantageously to 0%) until therefore no combustion takes place only in 20% or 10% of the engine cycles. If the NECR has dropped to approximately 0%, then a combustion takes place in virtually each engine cycle. Since an ignition takes place in at least 80% or 90% or 100% of the engine cycles and therefore a combustion can take place, the uncombusted fuel quantity, which can escape via the outlet of the internal combustion engine, is very small.

For adjusting the quantity of fuel to be supplied, a disturbance is introduced at rpms below the limit rpm and the rpm reaction of the engine is measured. Based on the rpm reaction of the engine, a determination can be made as to whether the supplied mixture is too rich or too lean. In the control range, this control of the fuel composition is not possible because, in the control range, an rpm reaction upwardly is not possible because of the rpm limiting. In work apparatus wherein the work tool mostly operates in the control range, such as in hedge trimmers, brushcutters or the like, an adequately good control of the fuel composition is therefore often not possible. It is therefore provided that a control variable for the engine is determined from parameters in the control range. Since the control variable is determined from parameters in the control range, the determination of the control variable is also possible for work apparatus which are operated in the control range.

Advantageously, a maximum of the noncombustion engine cycle ratio (NECR) is determined as the control variable in the control range. The maximum of the NECR is then determined in dependence upon the supplied air/fuel ratio or in dependence upon the supplied fuel quantity. The maximum of the NECR is indicated by the air/fuel ratio whereat the largest power per ignited engine cycle is achieved. This maximum power adjusts independently of the load acting in the engine so that the determination of the maximum of the NECR is also easily possible after an exchange of the work tool of the work apparatus. Advantageously, the maximum of the NECR or a percentage part of the maximum is used for adjusting a characteristic line which indicates the amount of fuel to be supplied as a function of rpm. A desired air/fuel ratio can be adjusted starting from the supplied fuel quantity at the maximum of the NECR. Here, it can be provided, for example, that the fuel quantity to be supplied is less than the power optimal fuel quantity at the maximum NECR or a pregiven percentage part of the maximum of the NECR in order to avoid an overenrichment of the engine. In order to ensure an adequate lubrication, a richer air/fuel ratio can, however, also be wanted. This can be dependent upon the type of work apparatus.

The course of the noncombustion engine cycle ratio (NECR) can fluctuate. Intense fluctuations are possible especially in the region of the maximum while fluctuations are hardly present for lesser NECRs. For determining a control variable for the engine, it can be advantageous for this reason not to select the maximum of the NECR but a pregiven percentage part of the maximum of the NECR. This pregiven percentage part can, for example, lie in the range of approximately 85% to approximately 95% of the maximum of the NECR. Here, it is advantageous to select a higher percentage part for the operation under load than for the operation without load. For example, for the operation under load, a percentage part of approximately 93% can be provided and for the operation without load, a percentage part of approximately 90% can be provided.

To adjust a characteristic line, which indicates the quantity of fuel to be supplied in each case for the entire rpm range, the maximum of the noncombustion engine cycle ratio or a pregiven percentage part of the maximum of the NECR is used.

For example, the characteristic line can be shifted in dependence upon the maximum of the NECR. Advantageously, for rpms below the limit rpm for adjusting the characteristic line, which indicates the quantity of fuel to be supplied as a function of rpm, the air/fuel ratio is changed and the change of the rpm, which results from the changed air/fuel ratio, is evaluated. Based upon the rpm change, the characteristic line, which indicates the fuel quantity to be supplied as a function of rpm, is adjusted. In this way, a desired air/fuel ratio can be adjusted for the internal combustion engine below the limit rpm as well as in the control range.

Advantageously, the air/fuel ratio is changed by changing the supplied fuel quantity. However, the supplied combustion air quantity can also be changed. To achieve a good control of the internal combustion engine, the unit for supplying fuel meters the fuel quantity, which is to be supplied, for each engine cycle. The unit for supplying fuel can, for example, be a valve, especially a switching valve (such as an electromagnetic valve or the like) which is connected to a control of the internal combustion engine.

It has been shown that a critical pattern of engine cycles can adjust in the control range for which cycles no ignition takes place. In this critical pattern of the engine cycles without ignition, extreme pressure courses result in the engine which greatly load the engine. It has also been shown that the resulting vibrations can lie in the range of the natural or resonance frequency of the drive train of the work apparatus so that the drive train is excited to vibrations which likewise can lead to an intense loading of the work apparatus. An independent inventive thought relates to the avoidance of this intense loading. For this purpose, it is provided that, in the control range, the critical pattern of the engine cycles, for which no ignition takes place, is identified. This can be any constant pattern or only one specific constant pattern. Especially, the frequency of the vibration, which adjusts for the pattern, corresponds to the natural frequency of the drive train. It is provided that the pattern of the engine cycles, which adjusts during operation, is advantageously continuously monitored and the ignition in the following engine cycle is suppressed when the pattern is coincident with a critical pattern of the engine cycles.

Because the ignition is suppressed also in the following engine cycle, the pattern is interrupted and another, especially an irregular pattern, adjusts. In this way, a constant critical noncombustion engine cycle ratio (NECR) pattern can be prevented in a simple manner. The engine cycle for which the ignition is suppressed is incorporated into the determination of the NECR. The rpm limiting via suppression of the ignition is not affected by the additional engine cycles for which no ignition takes place. The adjustment of the noncombustion engine cycle ratio for determining a control variable for the engine, for example, by changing the supplied fuel quantity, is still possible so that the control of the engine is not negatively influenced by the additional engine cycles for which no ignition takes place in order to avoid a critical NECR pattern.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
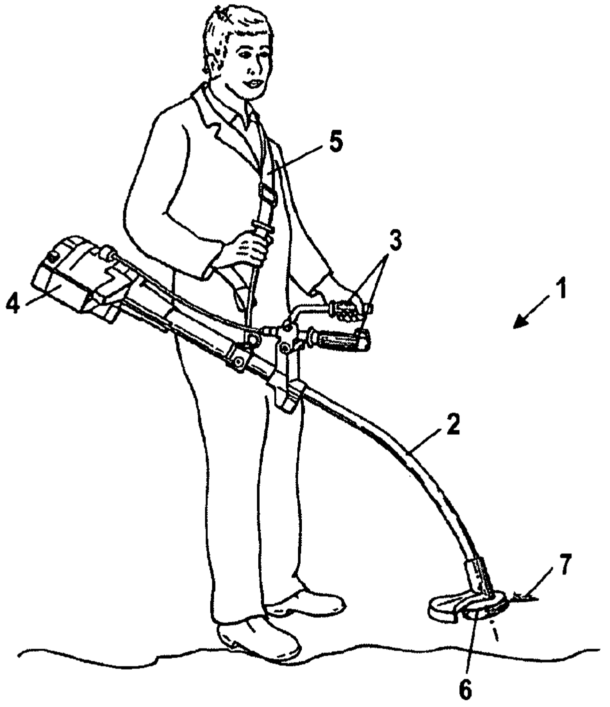
FIG. 1 is a schematic perspective view of a portable handheld work apparatus held by an operator.

FIG. 1 shows a portable handheld work apparatus which is a brushcutter 1 by way of example. In lieu of a brushcutter 1, the invention is also advantageous for hedge trimmers or any other handheld portable work apparatus such as motor-driven chain saws, cutoff machines and the like. Special advantages result when utilizing the invention with work apparatus which is driven mostly in the control range such as brushcutters or hedge trimmers.

The brushcutter 1 has a guide tube 2 on which two handles 3 are attached for guiding the brushcutter during operation. Furthermore, a carrier belt 5 is arranged on the guide tube 2 and is passed over the shoulder of the operator. A filament cutterhead 6 is arranged on the guide tube 2 at the end facing toward the ground. The filament cutterhead 6 includes a cutter filament 7. The filament cutterhead 6 is rotatably driven. A housing 4 is arranged at the other end of the guide tube 2 wherein an internal combustion engine is mounted for driving the filament cutterhead 6.

Figure 2:
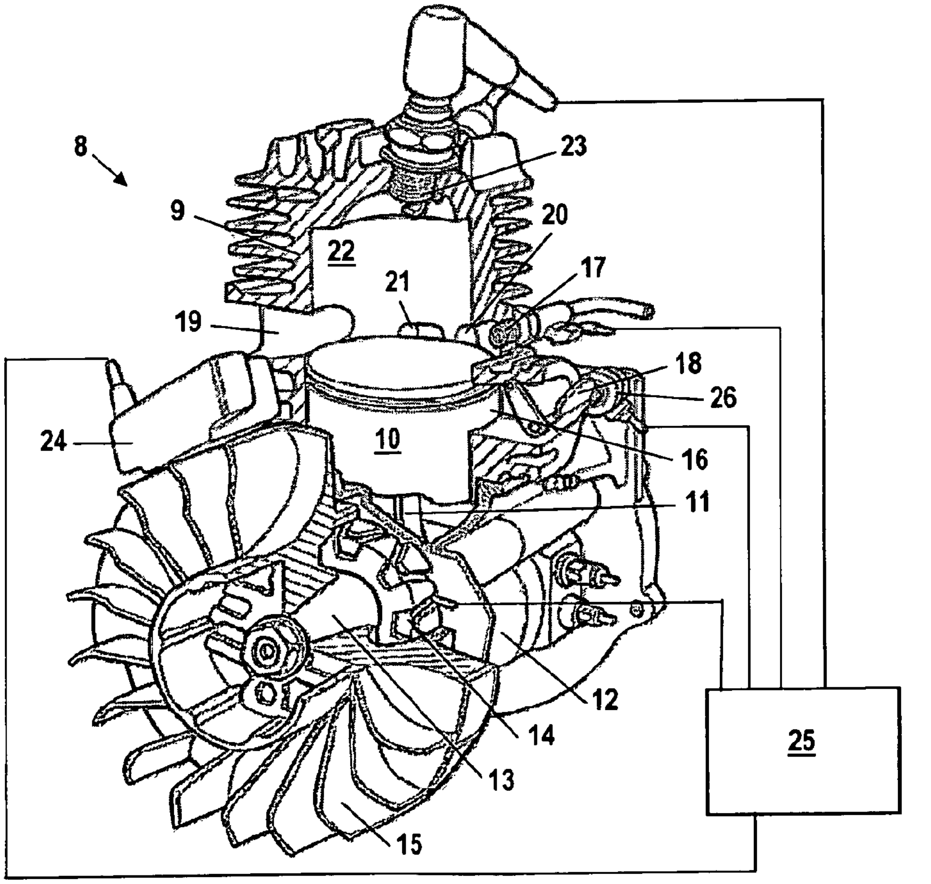
FIG. 2 is a perspective view of the internal combustion engine of the work apparatus of FIG. 1 shown partially in section.

The internal combustion engine 8 of the brushcutter 1 is shown in perspective in FIG. 2. The single cylinder internal combustion engine 8 is configured as a two-stroke engine. The engine 8 can, however, also be configured as a single-cylinder four-stroke engine. The internal combustion engine 8 has a cylinder 9 wherein a piston 10 is journalled to move back and forth. The piston 10 drives a crankshaft 13 via a piston rod 11. The crankshaft 13 is rotatably journalled in the crankcase 12. The piston 10 delimits a combustion chamber 22 formed in the cylinder 9 into which a spark plug 23 projects. The spark plug 23 is connected via a control unit 25 to an ignition module 24. The spark plug 23 together with the ignition module 24 and the part of the control unit responsible for the ignition define an ignition device.

At bottom dead center of the piston 10 shown in FIG. 2, the interior of the crankcase 12 is connected to the combustion chamber 22 via two transfer channels 21 and two transfer channels 20. In FIG. 2, only one of the transfer channels 20 and 21 are shown. An outlet 19 leads out of the combustion chamber 22. The two transfer channels 21 are arranged so as to be outlet near.

In the region of top dead center of piston 10, an inlet 16 opens into the crankcase 12 via which the combustion air is supplied. A throttle flap 18 is arranged in the channel leading to the inlet 16. The supplied combustion air quantity can be controlled via the throttle flap 18. The throttle flap 18 is equipped with a throttle flap sensor 26 which is connected to the control unit 25. The position of the throttle flap 18 is determined via the throttle flap sensor 26. The two transfer channels 20 are arranged to be inlet near. A fuel valve 17 is mounted in one of the transfer channels 20 and is likewise connected to the control unit 25 and supplies a fuel quantity, which is determined by the control unit 25 for this engine cycle, to the transfer channel 20 in each engine cycle. The fuel valve 17 is advantageously an electromagnetic switching valve.

A generator 14 is mounted on the crankshaft 13 and can generate the energy needed for the ignition of the spark plug 23. The energy can, however, also be generated in the ignition module 24. The generator 14 is connected to the control unit 25 and supplies the control unit as well as additional electrical units of the brushcutter 1 with energy. The generator 14 further functions to detect the rpm of the engine 8. A fan wheel 15 is fixedly mounted on the crankshaft 13 and moves cooling air for the engine 8.

Figure 3:
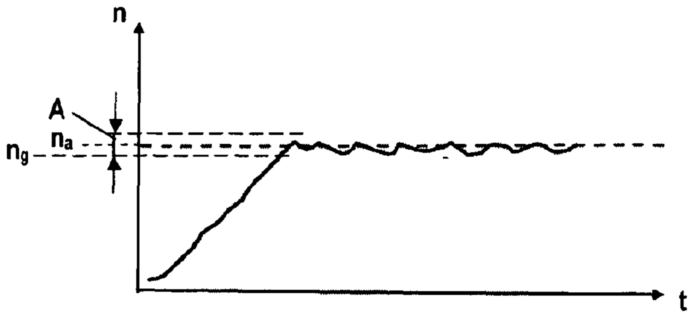
FIG. 3 is a schematic diagram showing the rpm course in the control range as a function of time.

As shown in FIG. 3, the rpm (n) of the engine 8 is limited above a limit rpm $n_g$. A control range A lies above the limit rpm $n_g$ wherein the limiting of the rpm takes place. A control rpm $n_a$ lies in the control range A and this control rpm $n_a$ is greater than the limit rpm $n_g$. The ignition of the engine 8 is suppressed when the control rpm $n_a$ is exceeded. Since no further combustion can take place, no further acceleration of the crankshaft 13 takes place so that the rpm again drops below the control rpm $n_a$. As soon as the rpm drops below the control rpm $n_a$, an ignition of the mixture again takes place in the combustion chamber 22. In this way, the rpm (n) again increases until it lies above the control rpm $n_a$. As soon as the rpm (n) exceeds the control rpm $n_a$, the ignition is again suppressed and the rpm again drops off. The rpm (n) can be effectively limited in a simple manner by the suppression of the ignition when exceeding the control rpm $n_a$.

Figure 4:
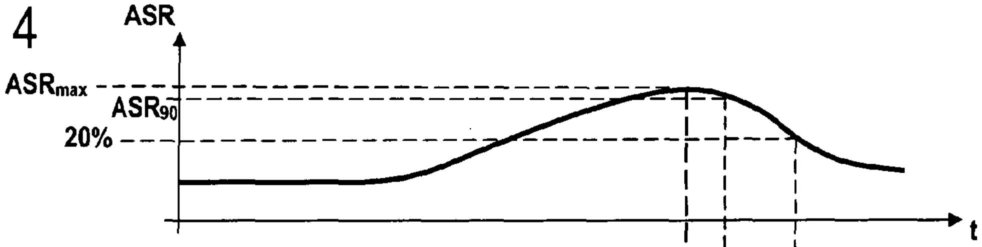
FIG. 4 is a schematic diagram showing the noncombustion engine cycle ratio (NECR) as a function of time.
Figure 5:
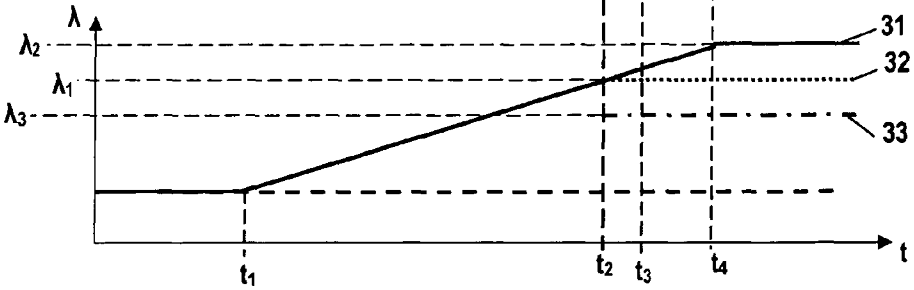
FIG. 5 is a schematic diagram showing the course of the air number λ as a function of time in the course of the NECR indicated in FIG. 4.

In the control range A, a noncombustion engine cycle ratio (NECR) adjusts which indicates the ratio of the engine cycles without combustion to the overall number of engine cycles. The NECR is dependent upon the supplied fuel quantity. In FIGS. 4 and 5, the resulting course of the NECR is shown as a function of time (t) for a pregiven course of the air number $\lambda$. The air number $\lambda$ is a measure for the air/fuel ratio. The air number $\lambda$ indicates the ratio of the air mass, which is actually available for combustion, referred to the air mass needed for a stoichiometric combustion. A value of the air number $\lambda$ below 1 means that the mixture is rich whereas an air number $\lambda$ of more than 1 characterizes a lean mixture. The course of the air number $\lambda$ corresponds to the course of the supplied fuel quantity for an air quantity remaining constant.

As FIGS. 4 and 5 show, the air number $\lambda$ continuously changes starting from a time point $t_1$. The air number $\lambda$ is increased, that is, the supplied fuel quantity is continuously reduced in a corresponding manner and the mixture is therefore made lean. The change, especially, the reduction of the supplied fuel quantity then advantageously takes place continuously. However, a stepwise change, especially a stepwise reduction, can also be provided. As shown in FIG. 4, the NECR first increases until it has reached a maximum NECR ($NECR_{max}$) at the time point $t_2$. If the air number $\lambda$ is increased further, the supplied fuel quantity is therefore further reduced and the NECR drops off again. At time point $t_3$, a noncombustion engine cycle ratio $NECR_{90}$ of 90% is reached, that is, an NECR which lies 10% below the maximum noncombustion engine cycle ratio $NECR_{max}$. At a time point $t_4$, an NECR of approximately 20% is reached. As the line 31 shows, the supplied fuel quantity is held constant after reaching an NECR of approximately 20%. The supplied fuel quantity is therefore very low whereas, at the same time, the number of engine cycles without combustion is also low. In this way, low exhaust-gas values result. The air number $\lambda$ is held at a value $\lambda_2$.

The maximum noncombustion engine cycle ratio $NECR_{max}$ adjusts for an air number $\lambda$ whereat the greatest power of the engine 8 per ignited engine cycle is reached. At this air number $\lambda$, the crankshaft 13 reaches the greatest acceleration so that also the rpm increase is maximal. Accordingly, the rpm remains comparatively long above the control rpm $n_a$ so that no ignition takes place over comparatively many further engine cycles. In handheld portable work apparatus such as hedge trimmers or brushcutters for which the engine 8 is operated mostly in the control range A, it can be advantageous to adjust an air/fuel ratio which corresponds to the power-optimal air number $\lambda_1$, that is, the air number at the maximum noncombustion engine cycle ratio $NECR_{max}$. As soon as a high power is required of the engine, for example, when a thick branch or the like is intended to be cut by the hedge trimmer, the maximum engine power is available immediately for this setting. This setting is indicated by the line 32 in FIG. 5. In order to achieve an adequate lubrication of the engine 8, it can, however, also be advantageous to adjust the air number $\lambda$ richer than the power-optimal air number $\lambda_1$. This is shown in FIG. 5 by the air number $\lambda_3$. The line 33 in FIG. 5 shows the course of the air number $\lambda_3$.

Figure 6:
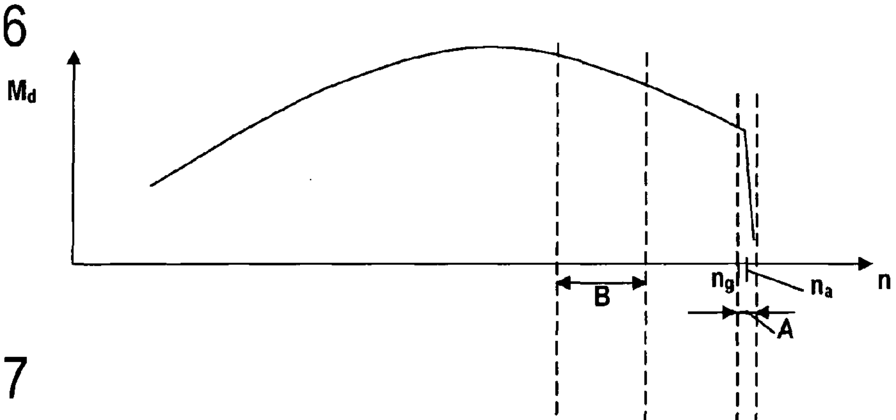
FIG. 6 is a schematic diagram of the course of the load of a portable handheld work apparatus as a function of rpm.

FIG. 6 shows by way of example the course of the engine load $M_d$ as a function of rpm (n). An operating rpm range B is provided after the maximum of the engine load $M_d$. At higher rpms (n), the limit rpm $n_g$ lies at a distance to the operating rpm range B and the control range A with the control rpm $n_a$ extends from this limit rpm $n_g$. As FIG. 6 shows, the rpm (n) drops in the control range A very greatly because of the rpm limiting by suppression of the ignition.

Figure 9:
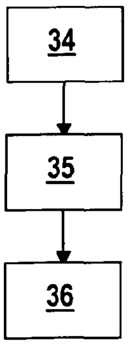
FIG. 9 is a flowchart showing the course of a method for adjusting a characteristic line.

In work apparatus, which usually operate in the operating rpm range B, the method shown schematically in FIG. 9 can be used to adjust the air number $\lambda$ and the fuel quantity (x) which is to be supplied. In method step 34, the air/fuel ratio is changed, for example, by changing the supplied fuel quantity. The supplied fuel quantity is then especially continuously adjusted. It can, however, also be advantageous to adjust the supplied fuel quantity in a stepwise manner. In method step 35, the change of the resulting rpm is evaluated. The rpm information is supplied to the control unit 25 via the generator 14. Based on the rpm reaction, that is, whether the rpm (n) decreases or increases after increasing the fuel quantity, a determination can be made as to whether the supplied air/fuel mixture is adjusted too rich or too lean. The change of the supplied fuel quantity then takes place advantageously in the direction until the optimal air/fuel ratio is reached, that is, when for a further enrichment as well for a further leaning, a reduction of the rpm (n) takes place. This determined optimal air/fuel ratio is used in method step 36 in order to adjust the characteristic line for the fuel quantity (x), which is to be supplied, over the entire rpm range (n). Depending upon the work apparatus, an optimal mixture can be adjusted or a mixture, which is too rich by a specific fuel component, or a mixture which is adjusted too lean.

Figure 7:
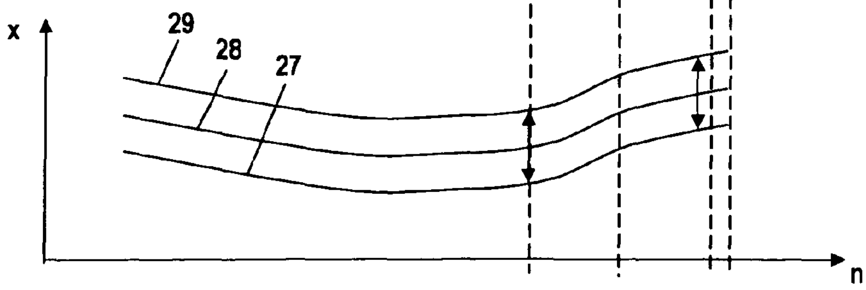
FIG. 7 is a schematic diagram of characteristic lines which indicate the quantity of fuel, which is to be supplied, as a function of rpm.

In FIG. 7, three characteristic lines 27, 28 and 29 are shown by way of example which show respective courses of the fuel quantity (x), which is to be supplied, as a function of rpm (n). The characteristic line 27 provides the lowest fuel quantity (x) to be supplied for each rpm (n), that is, the leanest mixture; whereas, the characteristic line 29 indicates for each rpm (n) the largest fuel quantity (x) to be supplied so that, for the characteristic line 29, the lowest air number $\lambda$ is adjusted. The characteristic line for the fuel quantity (x), which is to be supplied, can be moved between the characteristic lines 27, 28 and 29 or a suitable characteristic line can be selected. The selection of the suitable characteristic line is dependent upon the optimal fuel quantity (x), which is to be supplied, determined in the operating rpm range B.

In the control range, the adjustment of the characteristic lines (27, 28, 29) takes place based on the maximum noncombustion engine cycle ratio $NECR_{max}$. Based on the position of the maximum $NECR_{max}$ of the NECR, the characteristic line of the fuel quantity (x), which is to be supplied, is accordingly adjusted over the entire rpm range of the internal combustion engine 8. In lieu of the maximum $NECR_{max}$, a pregiven percentage part of the maximum $NECR_{max}$ is used for adjusting the characteristic line, for example, the noncombustion engine cycle ratio $NECR_{90}$, which is shown in FIG. 4 and which amounts to 90% of the noncombustion engine cycle ratio $NECR_{max}$. For the maximum noncombustion engine cycle ratio $NECR_{max}$, the power-optimal air number $\lambda_1$ is present. The characteristic lines (27, 28, 29) can be so displaced that the power-optimal air number $\lambda_1$ is present for the control rpm $n_a$. However, a characteristic line (27, 28, 29) can be selected for which the air number λ has a pregiven distance to the power-optimal air number $\lambda_1$ at the control rpm $n_a$. Here, an air number λ can be selected which is greater in order to achieve a lower fuel consumption or an air number λ can be selected which is less than the power-optimal air number $\lambda_1$ in order to obtain an improved lubrication of the engine 8. The fuel quantity (x) is adjusted in correspondence to the selected air number λ or the corresponding characteristic line (27, 28, 29) is selected.

Figure 8:
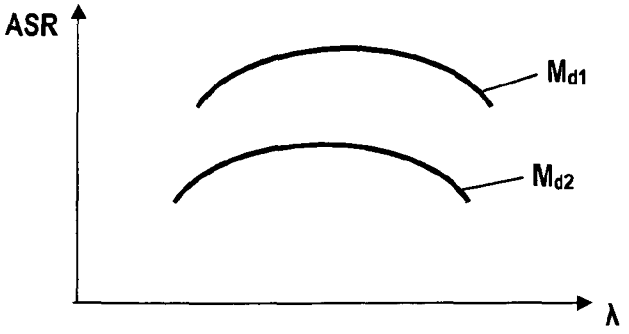
FIG. 8 is a diagram showing the NECR as a function of the air number at different loads of the work apparatus.

In FIG. 8, the course of the noncombustion engine cycle ratio NECR is shown for different engine loads $M_{d1}$ and $M_{d2}$. As FIG. 8 shows, in each case, a maximum of the NECR results independently of the load ($M_{d1}$, $M_{d2}$). Only the position of the curve, which indicates the NECR, changes for different loads. In this way, the suggested method can also be used for internal combustion engines 8 which are operated with different work tools. Only the maximum noncombustion engine cycle ratio in the form of $NECR_{max}$ or the course of the NECR is determined for controlling the supplied fuel quantity and not the absolute value thereof. For this reason, the suggested control is independent of engine load.

It has been shown that for internal combustion engines wherein the rpm is limited by suppressing the ignition, a critical pattern $P_{crit}$ of the engine cycles, for which no combustion takes place, can adjust in the control range A. This critical, usually constant pattern $P_{crit}$ leads to very high pressures in the engine 8. Vibrations occur which can lie in the region of the natural frequency of the drive train of the work apparatus, for example, of the brushcutter 1. In this way, resonance effects with high loads on the material and large vibrations result which are not wanted during operation. For internal combustion engines 8 wherein high vibrations adjust during operation, an operation in the control range A was up to now not possible. In order to nonetheless make possible an operation in the control range A and therewith also the control of the engine by adjusting the NECR, it is provided to intervene in the ignition for determining and adjusting the NECR.

Figure 10:
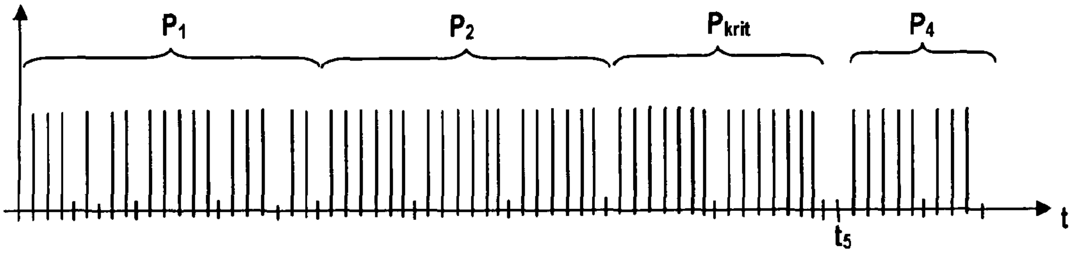
FIG. 10 is a diagram which shows the pattern of the engine cycles at which no ignition takes place as a function of time; and, FIG. 11 is a flowchart showing the course of a method for adjusting the pattern of the ignition.

In FIG. 10, the course of the pattern P of the engine cycles, for which an ignition takes place, is shown as a function of time (t) by way of example. Engine cycles, for which an ignition takes place, are characterized by a perpendicular line. At first, an irregular pattern $P_1$ adjusts. Thereupon, a uniform pattern $P_2$ follows wherein, for each six engine cycles with an ignition, an engine cycle without ignition follows. This pattern is followed by a pattern $P_{crit}$ wherein an engine cycle without ignition follows after seven engine cycles with ignition. A pattern of a total of 16 engine cycles wherein after each seven engine cycles with ignition, an engine cycle without ignition follows, defines, in the embodiment, a critical pattern $P_{crit}$. At time point $t_5$, the engine control therefore suppresses the ignition and this is independent of whether the rpm (n) is greater than the control rpm $n_a$ or not. Because of the additional engine cycle without ignition, the pattern of the engine cycles without combustion is disturbed and the formation of a resonance vibration is avoided. After time point $t_5$, a pattern $P_4$ adjusts which is again irregular.

Figure 11:
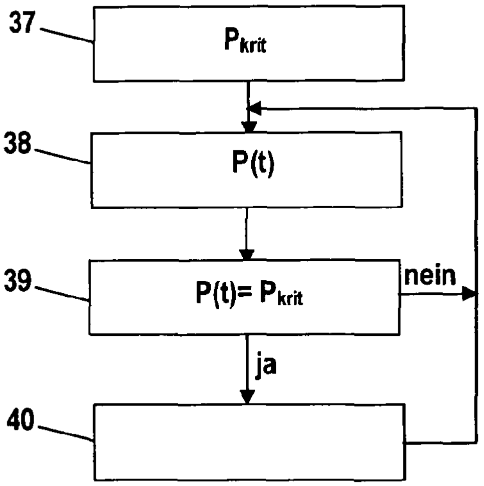

FIG. 11 shows the sequence of a method for engine control. In method step 37, the critical pattern $P_{crit}$ is identified. This can take place already during the manufacture of the work apparatus or, for example, can take place regularly during operation, for example, by monitoring the vibrations or pressure courses which adjust. In method step 38, the pattern P(t) is monitored continuously. In method step 39, the determined pattern P(t) is compared to the critical pattern $P_{crit}$. If the pattern P(t) is coincident with the critical pattern $P_{crit}$, then in method step 40, the ignition is suppressed in the following engine cycle and the pattern is disturbed. If the pattern P(t) deviates from the critical pattern $P_{crit}$, then there is no intervention in the ignition. Thereafter, the method is repeated starting from method step 38.

The monitoring of the critical pattern $P_{crit}$ of the engine cycles without ignition over the entire course of the engine cycles takes place independently of the change of the noncombustion engine cycle ratio NECR. In this way, it is made possible that even for engines wherein a resonance vibration can adjust in the control range A, a change of the NECR and the engine control is possible in dependence upon a parameter in the control range A. The rpm fluctuations of the engine become overall less so that a smooth running results. Monitoring of the pattern P can also be provided when the NECR is not changed.

It is understood that the foregoing description is that of the preferred embodiments of the invention and that various changes and modifications may be made thereto without departing from the spirit and scope of the invention as defined in the appended claims.

What is claimed is:

1. A method for operating an internal combustion engine assembly including an internal combustion engine, an ignition system for controlling the ignition in said engine, a device for supplying fuel and a detecting unit for detecting the engine rpm (n) of said internal combustion engine; said engine defining a permissible limit engine rpm ($n_g$) and a control range (A) of said engine rpm (n) above said limit engine rpm ($n_g$); the method comprising the steps of:

limiting said engine rpm (n) in said control range (A) by suppressing said ignition;

limiting the ignition in said control range (A) by suppressing the ignition in individual engine cycles wherein said engine rpm (n) lies above a control engine rpm ($n_a$);

forming a noncombustion engine cycle ratio (NECR) as the ratio of a number of engine cycles wherein the ignition is suppressed to the total number of the ignitions; and, shifting said noncombustion engine cycle ratio (NECR) in said control range (A).

2. The method of claim 1, wherein said noncombustion engine cycle ratio (NECR) is shifted by changing the supplied fuel quantity.

3. The method of claim 2, wherein said supplied fuel quantity is changed continuously.

4. The method of claim 3, wherein said supplied fuel quantity is reduced to shift said noncombustion engine cycle ratio (NECR).

5. The method of claim 1, wherein said noncombustion engine cycle ratio (NECR) is shifted until said noncombustion engine cycle ratio (NECR) has dropped to below 20%.

6. The method of claim 5, wherein said noncombustion engine cycle ratio (NECR) is shifted until said noncombustion engine cycle ratio (NECR) has dropped to below 10%.

7. The method of claim 6, wherein said noncombustion engine cycle ratio (NECR) is shifted until said noncombustion engine cycle ratio (NECR) has dropped to approximately 0%.

8. The method of claim 5, wherein a control variable for said engine is determined from parameters in said control range (A).

9. The method of claim 8, wherein a maximum ($NECR_{max}$) of said noncombustion engine cycle ratio (NECR) is determined in said control range (A).

10. The method of claim 9, wherein the method comprises the further steps of:

forming a characteristic line indicating a fuel quantity (x), which is to be supplied, as a function of said engine rpm (n); and, using said maximum ($NECR_{max}$) or a percentage part thereof for adjusting said characteristic line.

11. The method of claim 1, wherein the method comprises the further steps of:

forming a characteristic line indicating a fuel quantity (x), which is to be supplied, as a function of engine rpm (n);

for adjusting said characteristic line below said limit engine rpm ($n_g$), changing the air/fuel ratio and evaluating a change in said engine rpm (n) resulting from the changed air/fuel ratio.

12. The method of claim 11, wherein said air/fuel ratio is changed by changing the supplied fuel quantity.

13. The method of claim 1, wherein said device for supplying fuel meters the fuel quantity (x) which is to be supplied for each engine cycle.

14. The method of claim 1, wherein said method comprises the further steps of:

in said control range (A), monitoring a pattern (P) of engine cycles for which no ignition takes place; and, suppressing the ignition in the following engine cycle when said pattern (P) is coincident with a critical pattern ($P_{crit}$) of said engine cycles for which no ignition results.

* * * * *